(12) United States Patent
Cirette

(10) Patent No.: US 8,251,633 B2
(45) Date of Patent: Aug. 28, 2012

(54) CONTAINER INVERTING DEVICE

(75) Inventor: Damien Cirette, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 447 days.

(21) Appl. No.: 12/376,147

(22) PCT Filed: Jul. 23, 2007

(86) PCT No.: PCT/EP2007/057572
§ 371 (c)(1),
(2), (4) Date: Feb. 3, 2009

(87) PCT Pub. No.: WO2008/015121
PCT Pub. Date: Feb. 7, 2008

(65) Prior Publication Data
US 2010/0008752 A1 Jan. 14, 2010

(30) Foreign Application Priority Data

Aug. 4, 2006 (FR) ..................................... 06 53288

(51) Int. Cl.
*B66F 9/12* (2006.01)
*B21D 43/05* (2006.01)
*F16H 37/12* (2006.01)
(52) U.S. Cl. ........ 414/779; 414/419; 414/568; 414/785; 134/62; 74/37
(58) Field of Classification Search .............. 134/62; 187/283; 198/379, 403–404, 409, 803.8; 414/419–420, 422, 568, 621, 648, 754, 758, 414/773, 782, 785; 74/27, 37, 88, 89.2, 99 R
See application file for complete search history.

(56) References Cited

U.S. PATENT DOCUMENTS

| | | | | |
|---|---|---|---|---|
| 2,896,647 A | * | 7/1959 | Thomson, Jr. | 134/133 |
| 3,001,632 A | * | 9/1961 | Bell | 198/403 |
| 3,868,033 A | * | 2/1975 | Le Duff | 414/648 |
| 4,227,421 A | * | 10/1980 | Weishew | 74/27 |
| 4,889,438 A | * | 12/1989 | Forsyth et al. | 400/320 |
| 5,119,686 A | * | 6/1992 | Stillabower | 74/37 |
| 5,253,910 A | * | 10/1993 | Perrier | 294/116 |
| 5,255,493 A | | 10/1993 | Molison et al. | |

(Continued)

FOREIGN PATENT DOCUMENTS

CN 1445159 A 10/2003

(Continued)

OTHER PUBLICATIONS

International Search Report dated Nov. 13, 2007, in PCT application.

(Continued)

*Primary Examiner* — Gregory Adams
(74) *Attorney, Agent, or Firm* — Young & Thompson

(57) ABSTRACT

A container inverting device is capable of inverting containers that have a neck oriented in a first direction at the entrance of the device and then in a second direction at the exit of the device. The inverting device includes at least one clamp (45) for holding the neck of a container. The clamp (45) is mounted on a belt (49) by a fixing bracket (47), and in order to invert the container, the belt passes around at least one pulley (33) and moves the clamp from one side of the pulley (33) to the other.

4 Claims, 2 Drawing Sheets

U.S. PATENT DOCUMENTS 5,598,859 A * 2/1997 Kronseder .................. 134/62
5,743,374 A * 4/1998 Monsees .................. 198/403

FOREIGN PATENT DOCUMENTS

| DE | 4022486 | 8/1991 |
| JP | 3127621 | 12/1991 |
| JP | 6135414 A | 5/1994 |
| JP | 10005710 | 1/1998 |
| JP | 2004-12188 | 4/2004 |
| JP | 2006-043601 | 2/2006 |

OTHER PUBLICATIONS

Chinese Office Action, dated Mar. 10, 2011, in Application No. 200780028963.

Japanese Office Action, dated Feb. 21, 2012, in Application No. 2009-522214.

* cited by examiner

CONTAINER INVERTING DEVICE

The present invention relates to a device for inverting containers.

In the prior art, devices are known in which containers are oriented in a direction allowing them to be cleaned or filled. However, during the production of such containers, or else during their packaging, their vertical orientation must sometimes be changed.

In the prior art, also known are cleaning devices which make it possible to clean the internal walls of a container, such as a bottle, as it leaves a production machine or a machine for treatment after production of such containers. The cleaning station is fitted with a blower tube which extends on a substantially vertical axis. A source of pressurized gas delivers a blower gas to the internal walls of the container thanks to a nozzle supported by the tube and designed specially for this purpose. The container is supported with its opening (or neck) downward by a gripping means, such as a clamp, then is moved in translation relative to the blower tube. The pressurized gas is then injected and, because of the downward placement of the opening of the container, the dust and solid debris are blown out of the container.

Most particularly, when the containers are bottles, they usually reach such a cleaning device while being suspended by their neck, which is directed upward. In this case, the bottle must be inverted so that the neck of the bottle, and therefore its opening, is downward at least in the cleaning zone of the cleaning device.

In the prior art, bottle inversion devices have already been proposed that make it possible to position the neck of the bottles downward in the cleaning device. Such inversion devices are fitted with cams, clamps secured to carriages (or other mechanisms with rollers) arranged so that, when they move, the bottles, which are gripped by their neck while the latter is at the top, with the aid of the clamps, are inverted thanks to the combined action of the cams and carriages supporting the clamps, so that the necks are then directed downward. Then a raising and lowering mechanism makes it possible to move the bottles in translation along the blower tube.

In particular, inversion cams are known whose shape is substantially helical. However, such inversion cams become very difficult to use when it is desired to associate an inversion machine with a high-rate bottle-cleaning machine. More particularly, an inversion device designed around such a helical inversion cam is very difficult to adjust when it is desired to obtain high rates of bottle cleaning.

The present invention relates to a device for inverting containers which remedies the disadvantages of the prior art.

According to the invention, an inversion device comprises a belt to which a clamp for gripping the neck of a container is attached with the aid of a fastener and at least one pulley about which the belt is at least partially wound, and, in order to carry out the inversion of the container, means are provided for driving the belt about said pulley so as to cause the fastener of the clamp to pass by two diametrically opposed locations of the pulley.

According to one aspect of the invention, the belt is supported between two pulleys and it is secured to a first carriage which is driven in translation by a driving portion of driving means so that the driving of the carriage by said driving portion causes that of the belt.

According to one aspect of the invention, the inversion device comprises a means for adjusting the loading and unloading position of the inversion mechanism.

According to one aspect of the invention, the means for adjusting the loading and unloading position comprises a fixed stop, secured to a frame.

According to one aspect of the invention, the fastener is arranged so that, in the absence of stop, the clamp is slightly inclined downward and the height of the stop relative to the frame of the inversion mechanism is adjusted so that the clamp is in a determined reference position in position awaiting a container.

According to one aspect of the invention, the inversion device comprises a means for adjusting the "inverted" position of the clamp.

According to one aspect of the invention, the means for adjusting the "inverted" position of the clamp comprises a means for adjusting the position of attachment of the carriage secured to a first bar for connection to the driving means.

According to one aspect of the invention, the driving means are connected by a first bar to the carriage secured to the belt, the first bar being secured to a second carriage which can slide along a guide and which is connected to the driving means with the aid of another bar, said other bar supporting a first movable stop which is facing a second fixed stop.

According to one aspect of the invention, the inversion device comprises a means for removing the clearances and adjustment errors in the inversion mechanism.

According to one aspect of the invention, said means for removing the clearances and adjustment errors in the inversion mechanism comprises an element of adjustable length attached by one end to a frame supporting the pulleys and another end to a pulley.

According to one aspect of the invention, a portion of the frame is connected by a second bar to a second carriage that is movable on a guide, a fourth bar connects the second carriage on the one hand to the fixed stop and to a first end of the element of adjustable length and on the other hand to an adjustment stop, the element of adjustable length having a second end which is secured by a fifth bar to the driving means.

According to one aspect of the invention, the second stop comprises an element for adjusting its position relative to the travel of the first stop making it possible to provide a vertical force capable of keeping the fourth bar pressing on the adjustment stop, and to do so irrespective of the position of the driving means.

According to one aspect of the invention, the elements of adjustable length are formed by sprung mechanisms, the elongation of which at rest is initially adjusted so as to balance the static forces on the inversion mechanism and of which the coefficient of elongation is computed so as to balance the dynamic forces on the inversion mechanism during the movement of inversion of the bottles loaded onto the clamp.

According to one aspect of the invention, the driving means comprise a cam and a cam follower roller secured to the inversion mechanism, with its frame mounted with the cam follower on a carousel so that, during the rotation of the carousel, the cam follower follows a vertical course when the inversion mechanism moves to determined angular positions.

According to one aspect of the invention, the inversion device comprises a plurality of inversion mechanisms operating in parallel.

According to one aspect of the invention, the inversion axes are tangential to a circle on which the inversion mechanisms are placed with angular pitches allowing the simultaneous inversion of the bottles.

The invention will be better understood with the aid of the description and appended figures amongst which:

Figure 1:
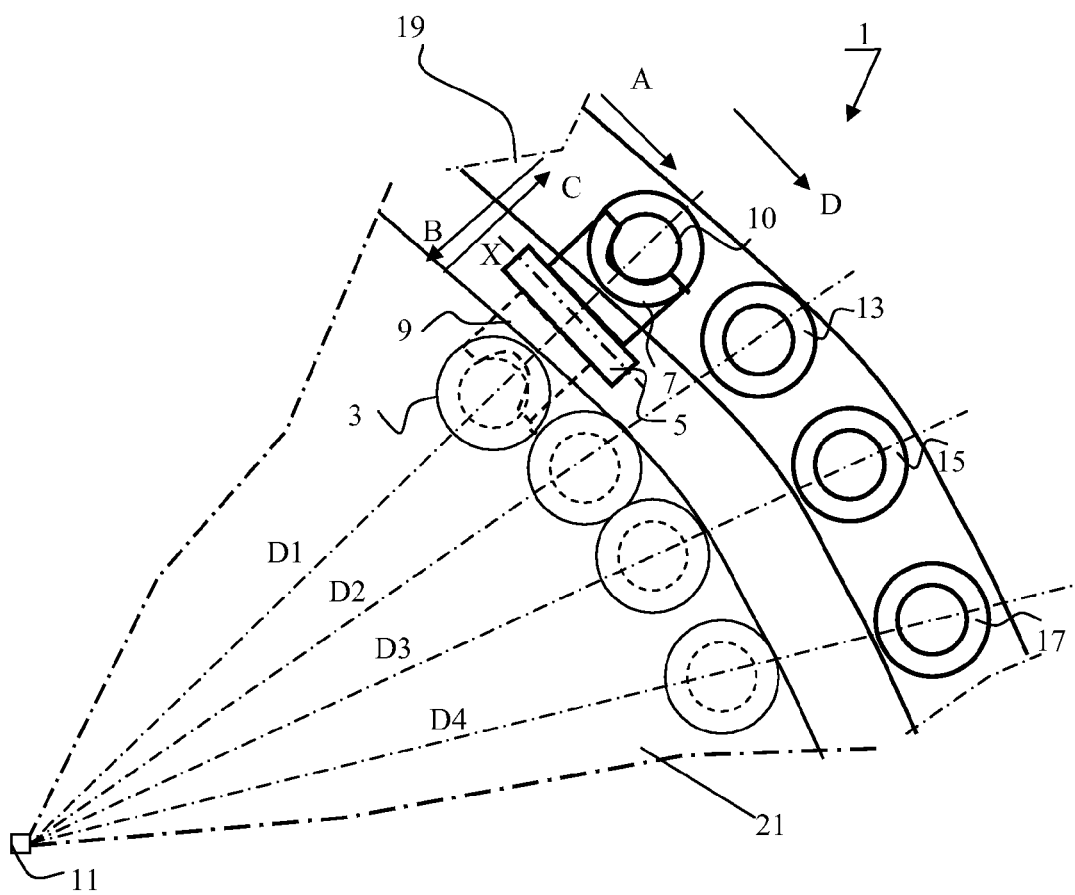
FIG. 1 represents a diagram of an inversion device according to the invention.

FIG. 1 depicts a top view of a diagram of an inversion device according to the invention, which device is designated by the general reference number 1 and forms a portion of a treatment machine, which machine is not entirely shown. The containers, in this instance bottles of which only the neck is represented seen from above, are brought at least one by one to the entrance 19 of the inversion device 1. Let us consider the bottle 10: it is transferred to the inversion device 1 in line with the movement of the arrow A. An individual inversion mechanism 5 is furnished with a clamp 7 which grips the bottle by its neck. The inversion device 5 inverts the bottle 10 in the direction of the arrow B in order to place the bottle in the inverted position 3. This step is carried out by causing the clamp 7 to rotate about a horizontal axis X that is perpendicular to the transfer axis D1; the clamp 7 is then in the position depicted in dashed lines 9. Once the treatment has been applied on the device 1, the individual inversion mechanism 5 executes the reverse movement in the direction of the arrow C so that the inverted bottle in the position 3 returns to its initial position 10. Then, the inversion device advances by an additional pitch so that the treated and inverted bottle again in the initial position is transferred in the direction of the arrow D.

In a particular embodiment that can be seen in FIG. 1, instead of using a single inversion device like the inversion mechanism 5, the inversion device 1 of the invention comprises several inversion mechanisms (in this instance four mechanisms have been shown) identical to the inversion mechanism 5 and aligned respectively along axes D1 to D4. The angular pitch between the axes D1 to D4 is computed so that, despite the closeness provided by the movement of inversion about the horizontal axis of each inversion mechanism, the inverted bottles do not collide and may then be treated with the aid of the treatment devices provided in the treatment machine represented partially in FIG. 1.

In a particular application, the treatment machine comprises a circular turntable or carousel 21 with a central axis 11. The carousel 21 comprises at least four nozzles and/or tubes for blowing a pressurized rinsing fluid which is then injected into each of the four inverted bottles. Once the four inverted bottles have been rinsed, the four inversion mechanisms like the mechanism 5 again invert the four bottles and return them, on the transfer carousel 21 of the inversion device, to the external position that they occupied at the time of their introduction, so that they can for example be taken out of the device.

Such an operation in parallel is made possible by the fact that each of the axes D1 to D4 has an angular spacing with its neighbors that is sufficient to allow the bottles to be inverted.

Figure 2:
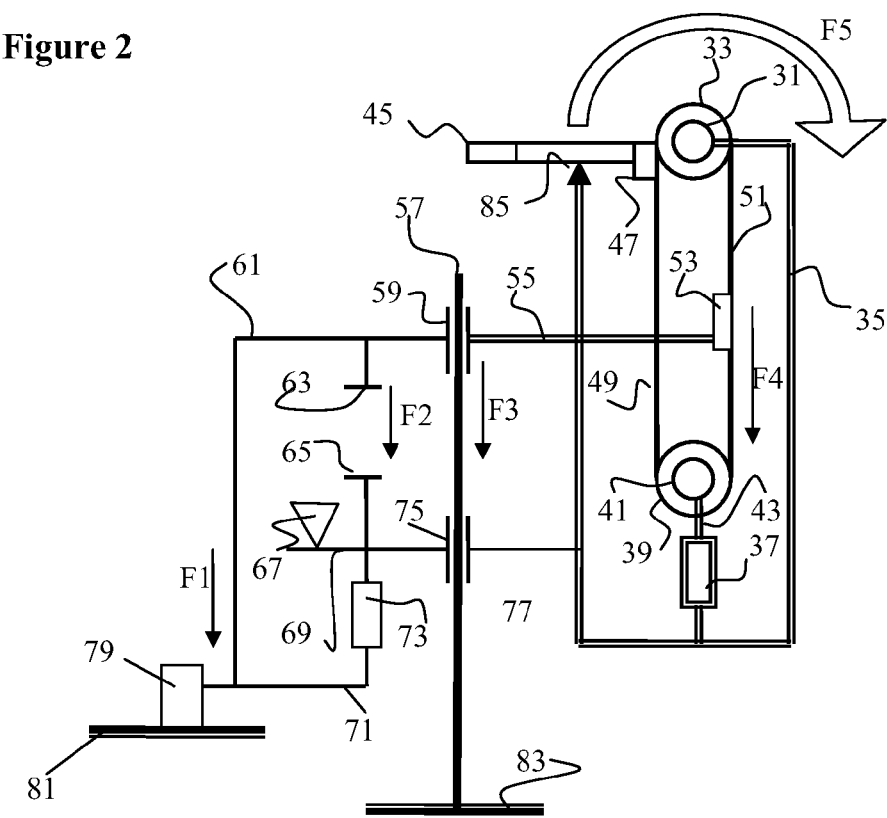
FIGS. 2 and 3 are two views of a diagram of one embodiment of the invention in two states of the device.
Figure 3:
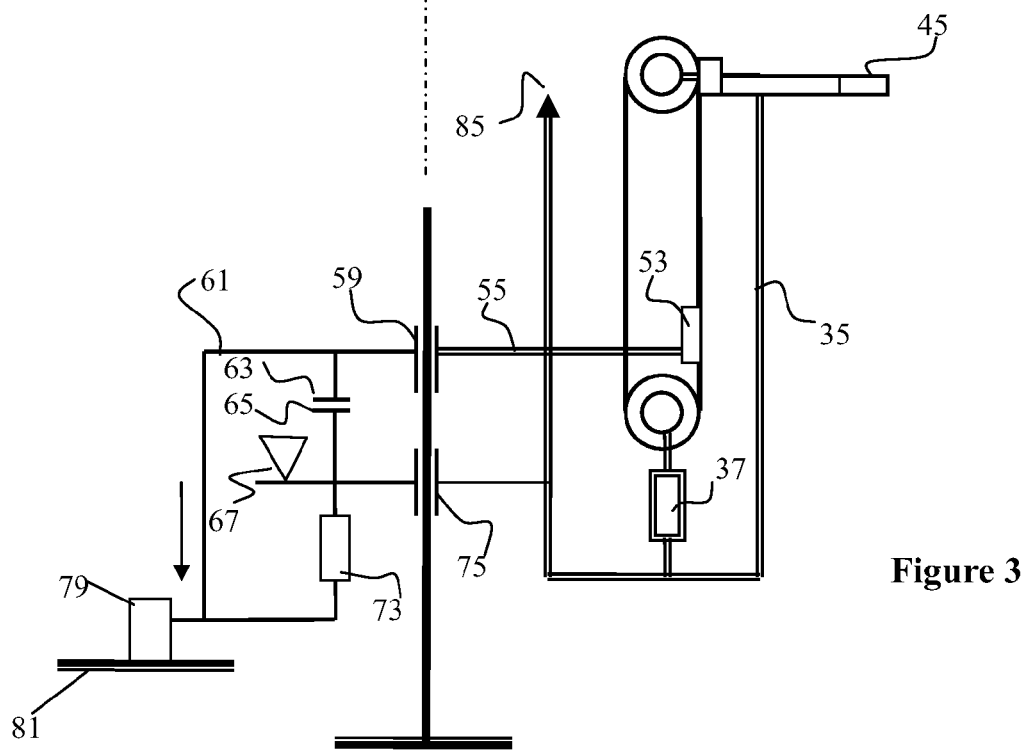

FIGS. 2 and 3 show, in two different positions, the diagram of the inversion mechanism for a single bottle. It is understood that the diagram may be repeated for any number of mechanisms placed in parallel, as in FIG. 1.

In FIG. 2, a clamp 45 has been shown on the inversion mechanism in its initial position before the inversion movement begins. As is known in the prior art, the clamp 45 grips a bottle by its neck, the orientation of the bottle therefore being directed toward the top of the figure. The clamp is attached, by an articulated fastener 47, to a belt 49 which is driven by the rotation of two pulleys, respectively a first pulley 33 and a second pulley 39.

The clamp 45 is fastened so that, when the belt 49 is set in motion as will be described below, the clamp begins a movement of rotation about the pulley 33 in the direction of the arrow F5, and passes opposite two diametrically opposed points of the pulley so that it changes orientation and allows the container that is attached thereto to be inverted. The inversion mechanism shown in the embodiment of FIG. 2 comprises driving means which allow the belt 49 to travel.

The driving means comprise essentially a driving portion 79, 81, like a cam mechanism, which drives in translation a first carriage 53 secured to a strand 51 of the belt 49, this strand being driven in a first portion of the inversion movement in a descending movement, illustrated by the arrow F4.

When the driving means are controlled to start the inversion movement, the strand 51 of the belt is driven in the direction of the arrow F4 by the translation of the carriage 53 so that the belt drives the clamp 45 in the direction of the arrow F5. The distance driven is such that the fastening means 47 and therefore the associated clamp 45 pass from one side (considered in the vertical plane) to the other of the pulley 33 and therefore in at least two diametrically opposed points of the pulley 33, which causes the clamp to invert. At the end of the inversion, the driving means stop the translation of the carriage 53 and an appropriate treatment may be applied to the inverted bottle carried by the clamp 45.

To invert the bottle and return it to its loading point, the driving means then control a translation of the carriage 53 in the direction opposite to the arrow F4 and the clamp 45 sustains a rotation about the pulley 33 in the direction opposite to the arrow F5. The bottle, for example having sustained the rinsing treatment, may then be unloaded from the clamp 45 and returned to the transfer carousel 21 (see FIG. 1).

In the embodiment of FIG. 2, a means of adjusting the position of loading and unloading of the inversion mechanism has been provided. Thanks to this means for adjusting the loading and unloading position, the loading position of the clamp 45 is determined by a stop 85 secured to a frame 35 of the transfer mechanism. To carry out an effective adjustment of the transfer mechanism, the fastener 47, which, it will be remembered, is articulated, is computed so that, in the absence of a stop 85, the clamp 45 is slightly inclined downward. The height of the stop 85 relative to the frame 35 of the inversion mechanism is adjusted so that the clamp 45 in the position awaiting a bottle, is perpendicular to the direction of the belt 49, therefore horizontal.

In the embodiment of FIG. 2, a means for adjusting the "inverted" position of the clamp 45 has been provided.

In particular, the means for adjusting the "inverted" position of the clamp 45 comprises a means for adjusting the position for attachment of the first carriage 53 secured to a first bar 55 for connection to the driving means 79, 81. In particular, the first carriage 53 consists of two plates mounted on either side of the belt. The plates are joined together through or on either side of the belt. The carriage 53 and the belt 49 are secured by connecting elements such as screws. During the adjustment of the inversion mechanism, the operator loosens the screws and makes the carriage 53 slide along the belt until a correct position of the carriage 53 is reached. He may then retighten the screws to secure the carriage to the belt.

Accordingly, the driving means 79, 81 are connected by the first bar 55 to the first carriage 53 secured to the strand 51 of the belt 49. The first bar 55 is secured to a second carriage 59 which can slide along a guide 57. The second carriage 59 is connected to the driving means with the aid of another bar 61.

The other bar 61 supports a first stop 63 which faces a second stop 65. The position of which may be adjusted so as to reduce the travel with the first stop 63, said travel being represented by the arrow F2. When the first stop 63 meets the second stop 65, the clamp 45 has finished its inversion travel F5.

In another embodiment not shown, the position of the stop 65 is not adjustable so the travel F2 is not adjustable either. The latter is fully dependent on the travel of the driving means 79, 81.

In the embodiment of FIG. 2, a means for removing the clearances and adjustment errors in the inversion mechanism have been provided. Accordingly, the first pulley 33 is mounted on a first shaft 31 secured to a bearing of the frame 35 of the inversion mechanism. The second pulley 39 is mounted on a second shaft 41 secured to the frame 35 of the inversion mechanism by means of a connecting bar 43 at one end of a means 37 of adjustable length. The means 37 of adjustable length is attached by another end to the frame 35.

In addition, the portion of the frame 35 secured to the adjustable means 37 is connected by a second bar 77 to a third carriage 75 that can be moved on a guide like the guide 57. Furthermore, a fourth bar 69 connects the third carriage 75 on the one hand to the fixed stop 65 and to a first end of a second element of adjustable length 73 and on the other hand to an adjustment stop 67. A second means 73 of adjustable length has a second end which is secured by a fifth bar 71 to the driving means 79, 81.

All of the elements 63, 65, 67, 75, 69 and 73 are there to provide the transition between the first objective of the mechanism, which is to invert the bottles (described above), to the second objective which is to provide a vertical movement of each bottle along a cleaning nozzle for example. The driving means 81 such as a cam has 2 ramps, one after the other.

The first ramp is used to provide the inversion. During this inversion, all of the elements 61, 59, 55 move vertically. The frame 35 is immobile thanks to the pressure of the second adjustable means 73 such as a spring which holds the connecting bar 69 on the stop 67. There is therefore a relative movement of all the elements 61, 59, 55 and 53 relative to all of the elements 35, 51, 47, 41, 39, 37, 43, 31, 33 which makes it possible to actuate the belt and therefore to invert the clamp.

When the driving means 79 such as a roller is at the end of the first ramp of the cam, the inversion is complete. The stops 63 and 65 are in contact. The second adjustable means 73 such as a spring is expanded but still provides a sufficient pressure, which ensures "cohesion" between the first assembly 61, 59, 55 and the second assembly 35, 51, 47, 41, 39, 37, 43, 31, 33.

When the driving means 79 such as a roller rolls on the second ramp, the two assemblies slide vertically relative to the support 83, the bar 69 separates from the stop 67, the latter being fixed relative to the support 83. The inverted bottle then makes a downward vertical movement.

Preferably, the third carriage 75 slides on the same guide and follows the same path as the second carriage 59. The guide 57 is secured to the frame and for example secured to the fixed element to which the driving means 79, 81 are connected.

Preferably, when the elements of adjustable length consist of sprung mechanisms, their elongation at rest is initially adjusted so as to balance the static forces on the inversion mechanism and their coefficient of elongation is computed so as to balance the dynamic forces on the inversion mechanism during the movement of inversion of the bottles loaded on the clamp 45.

FIG. 3 shows the inversion mechanism of FIG. 2 in its "inverted" position. To allow the comparison of the two states, the axis of the guide 57 has been used as the positioning reference. In addition, only a few of the reference numbers have been transferred and reference should be made to the corresponding elements in FIG. 2 for their explanation.

In FIG. 3, the first stop 63 has made contact with the second fixed stop 65. The first carriage 53 is shown in the bottom position and the clamp 45 has been shown in the "inverted" position.

Preferably, the driving means comprise a cam 81 and a cam follower roller 79 secured to the third bar 61 and/or to the fifth bar 71. The inversion mechanism, with its frame 35 and all of the five bars described above are mounted with the cam follower 79 onto a carousel, like the carousel 21 of FIG. 1 so that, when the carousel rotates, the cam follower follows a vertical course during the passage of the inversion mechanism to determined angular positions.

In another embodiment, the inversion is supplemented by a downward movement of the clamp 45 on which the neck of a container such as a bottle has been placed as has been described with the aid of FIG. 1. The descent of the container, not shown in FIGS. 2 and 3 to prevent over complicating them, makes it possible notably to insert a rod (not shown) into the container for blowing and/or injecting a cleaning fluid such as air and/or a disinfectant fluid. In this case, the rod (not shown in FIGS. 2 and 3) is placed vertically in parallel with the central axis of the inverted container and a blower and/or injection mechanism (not shown) to which the rod is connected is activated by a bottom position sensor (not shown in the drawing) which detects the passage of the inverted container after the top position into a zone for blowing and/or injection of fluids. When the programmed blowing and/or injection operation is complete, the cam follower 79 causes the reverse movement of the container which, mounted on the clamp 45, rises on the strand on the right of FIG. 3 and returns to the top inversion position described above for the adjustment of the inversion device. Then, the movement continues to replace the container with the neck upward.

Note that the stop 65 must then be placed so as to allow the continuation of the descent beyond the "top" inversion position at the entrance of the rectilinear section of the strand "on the right" of FIG. 3 on the belt 51. In this instance it is a simple adaptation measure that can be executed on adjustment of the device of the invention. For this purpose, the adjustment of the travel of the carriage 53 along the strand 51 "on the right" in FIGS. 2 and 3 ensures that the clamp 45 passes from a position "on the left" of the pulley 33 in FIG. 2, to a position "on the right" of the pulley 33 in FIG. 3, then again a travel along the strand 51 "on the right" in the downward direction up to the blowing and/or injection zone on the rod of the blowing and/or injection mechanism. When the clamp 45 has reached the end of the travel, the cam follower 79 meets a portion of cam 81 providing the inversion of the movement of the clamp 45, which rises along the strand "on the right" in FIG. 2 to reach the top position "on the right" of the pulley 33, and finally makes the reverse inversion movement which brings the clamp and the container such as a bottle into the initial position "on the left" of the pulley 31 in FIG. 2 where the clamp is then opened to release the bottle after washing and/or blowing.

The invention claimed is:

1. A device for inverting containers having a neck directed in a first direction in one location of the device then, in a second direction, opposite to the first, in another location of the device, the device comprising:
    a belt (49) to which a clamp (45) for gripping, during inversion, the neck of a container is attached with the aid of a fastener (47) and at least one pulley (33) about which the belt is at least partially wound, and in that, in order to carry out the inversion of the container, means (79, 81, 53) are provided for driving the belt about said pulley so as to cause the fastener (47) of the clamp to pass by two diametrically opposed locations of the pulley, the belt (49) supported between two pulleys (33, 39) and secured to a first carriage (53) which first carriage is driven in translation by a driving portion (79, 81) of the driving means so that the driving of the carriage (53) by said driving portion causes the driving of the belt (49), a means for adjusting the inverted position of the clamp (45), wherein the driving means (79, 81) are connected by a first bar (55) to the first carriage (53) secured to the belt (49), the first bar (55) being secured to a second carriage (59) which can slide along a guide (57) and which is connected to the driving means with the aid of another bar (61), said other bar (61) supporting a first movable stop (63) which is facing a second stop (65).

2. A device for inverting containers having a neck directed in a first direction in one location of the device then, in a second direction, opposite to the first, in another location of the device, the device comprising:

a belt (49) to which a clamp (45) for gripping, during inversion, the neck of a container is attached with the aid of a fastener (47) and at least one pulley (33) about which the belt is at least partially wound, and in that, in order to carry out the inversion of the container, means (79, 81, 53) are provided for driving the belt about said pulley so as to cause the fastener (47) of the clamp to pass by two diametrically opposed locations of the pulley, the belt (49) supported between two pulleys (33, 39) and secured to a first carriage (53) which first carriage is driven in translation by a driving portion (79, 81) of the driving means so that the driving of the carriage (53) by said driving portion causes the driving of the belt (49) characterized in that it comprises a means for removing the clearances and adjustment errors in the inversion mechanism characterized in that said means for removing the clearances and adjustment errors in the inversion mechanism comprises an element of adjustable length (37) attached by one end to a frame (35) supporting the pulleys (33, 41) and another end to a pulley (39), wherein a portion of the frame (35) is connected by a second bar (77) to a second carriage (75) that is movable on a guide (57), a fourth bar (69) connects the second carriage (75) on the one hand to the fixed stop (65) and to a first end of the element of adjustable length (73) and on the other hand to an adjustment stop (67), the element of adjustable length (73) having a second end which is secured by a fifth bar (71) to the driving means (79, 81).

3. The device as claimed in claim 2, characterized in that the second stop (65) comprises an element for adjusting its position relative to the travel of the first stop (63) making it possible to provide a vertical force capable of keeping the fourth bar (69) pressing on the adjustment stop (67), and to do so irrespective of the position of the driving means.

4. A device for inverting containers having a neck directed in a first direction in one location of the device then, in a second direction, opposite to the first, in another location of the device, the device comprising:

a belt (49) to which a clamp (45) for gripping, during inversion, the neck of a container is attached with the aid of a fastener (47) and at least one pulley (33) about which the belt is at least partially wound, and in that, in order to carry out the inversion of the container, means (79, 81, 53) are provided for driving the belt about said pulley so as to cause the fastener (47) of the clamp to pass by two diametrically opposed locations of the pulley, the belt (49) supported between two pulleys (33, 39) and secured to a first carriage (53) which first carriage is driven in translation by a driving portion (79, 81) of the driving means so that the driving of the carriage (53) by said driving portion causes the driving of the belt (49) characterized in that it comprises a means for removing the clearances and adjustment errors in the inversion mechanism characterized in that said means for removing the clearances and adjustment errors in the inversion mechanism comprises an element of adjustable length (37) attached by one end to a frame (35) supporting the pulleys (33, 41) and another end to a pulley (39), wherein the elements of adjustable length are formed by sprung mechanisms, the elongation of which at rest is initially adjusted so as to balance the static forces on the inversion mechanism and of which the coefficient of elongation is computed so as to balance the dynamic forces on the inversion mechanism during the movement of inversion of the bottles loaded onto the clamp (45).

* * * * *